United States Patent
Rao et al.

(10) Patent No.: US 7,158,015 B2
(45) Date of Patent: Jan. 2, 2007

(54) VISION-BASED METHOD AND SYSTEM FOR AUTOMOTIVE PARKING AID, REVERSING AID, AND PRE-COLLISION SENSING APPLICATION

(75) Inventors: Manoharprasad K. Rao, Novi, MI (US); Kwaku O. Prakah-Asante, Commerce Township, MI (US); Gary Steven Strumolo, Beverly Hills, MI (US); Samuel Edward Ebenstein, Southfield, MI (US); Gregory H. Smith, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 79 days.

(21) Appl. No.: 10/604,490

(22) Filed: Jul. 25, 2003

(65) Prior Publication Data

US 2005/0017857 A1    Jan. 27, 2005

(51) Int. Cl.
*B60Q 1/00* (2006.01)
(52) U.S. Cl. ............... 340/436; 340/434; 340/437; 340/438; 340/932.2; 340/428; 701/36; 348/148; 348/149
(58) Field of Classification Search ........... 340/901, 340/932.2, 428, 435–438; 348/148, 149; 701/36, 41, 53–71
See application file for complete search history.

(56) References Cited

U.S. PATENT DOCUMENTS

| | | | | |
|---|---|---|---|---|
| 5,091,726 A | * | 2/1992 | Shyu ........................... | 701/96 |
| 6,222,447 B1 | * | 4/2001 | Schofield et al. ........... | 340/461 |
| 6,487,481 B1 | * | 11/2002 | Tanaka et al. ................ | 701/41 |
| 6,498,620 B1 | * | 12/2002 | Schofield et al. ........... | 348/148 |
| 6,587,760 B1 | * | 7/2003 | Okamoto ...................... | 701/1 |
| 2004/0145457 A1 | * | 7/2004 | Schofield et al. ........ | 340/425.5 |

OTHER PUBLICATIONS

Detlev Noll, Martin Werner and Werner Von Seelen, Real-Time Vehicle Tracking and Classification, pp. 101-106.
Michael E. Brauckmann, Christian Goerick, Jurgen Groβ and Thomas, Towards All Around Automatic Visual Obstacle Sensing For Cars, pp. 79-84.
Michael Schwarzinger, Thomas Zielke, Detlev Noll, Michael Brauckmann, Werner Von Seelen, Vision-Based Car-Following: Detection, Tracking, And Identification, pp. 24-29.
Wolfgang Efenberger, Quang-Huy Ta, Lampros Tsinas, Volker Graefe, Automatic Recognition of Vehicles Approaching from Behind, pp. 57-62.
Christian Goerick, Detlev Noll, Martin Werner, Artificial Neural Networks In Real-Time Car Detection And Tracking Applications, pp. 335-343.

(Continued)

*Primary Examiner*—Julie Bichngoc Lieu
(74) *Attorney, Agent, or Firm*—Frank A. MacKenzie; Artz & Artz, P.C.

(57) ABSTRACT

A vision-based object detection decision-making system (10) for a vehicle (12) includes multiple vision sensing systems (14) that have vision receivers (20) and that generate an object detection signal. A controller (16) includes a plurality of sensing system aid modules (18) that correspond to each of the vision sensing systems (14). The controller (16) operates the sensing system aid modules (18) in response to a vehicle parameter and generates a safety system signal in response to the object detection signal. The sensing system aid modules (18) have associated operating modes and operate the vision sensing systems (14) in the operating modes in response to the vehicle parameter.

20 Claims, 5 Drawing Sheets

OTHER PUBLICATIONS

Alan J. Lipton, Hironobu Fujiyoshi, Raju S. Patil, Moving Target Classification and Tracking from Real-Time Video, The Robotics Institute, Carnegie Mellon University, pp. 129-136.

Axel Techmer, Jens Harnisch and Ulrich Ramacher, Intelligent Vision Sensor For Automotive Applications, Infineon Technologies AG, Corporate Research, Copyright 2002, SAE, Inc.

* cited by examiner

VISION-BASED METHOD AND SYSTEM FOR AUTOMOTIVE PARKING AID, REVERSING AID, AND PRE-COLLISION SENSING APPLICATION

CROSS REFERENCE TO RELATED APPLICATIONS

The present invention is related to U.S. patent application Ser. No. 10/064,550, filed Jul. 25, 2002, entitled "Potential Collision Detection and Parking Aid System", U.S. patent application Ser. No. 10/064,552, filed Jul. 25, 2002, entitled "Potential Collision Detection and Reversing Aid System", and U.S. patent application Ser. No. 10/249,549, filed Apr. 17, 2003, entitled "Leaky Cable Based Method and System for Automotive Parking Aid, Reversing Aid, and Pre-Collision Sensing", which are incorporated by reference herein.

BACKGROUND OF INVENTION

The present invention relates to several different sensing systems for an automotive vehicle, such as parking-aid, reversing-aid, and pre-collision sensing systems, and more particularly to a system and method of performing object detection for the stated systems utilizing vision technology.

Various sensing systems currently exist for detection, classification, tracking, and relative distance and velocity estimation of objects within a close proximity of a host automotive vehicle. The sensing systems may be ultrasonic, radar, or vision-based. The ultrasonic-based systems are used primarily for parking-aid and reversing-aid applications whereas the vision-based systems are used primarily for parking-aid, lane departure, lane-keeping and adaptive cruise control applications. The radar-based systems may be used in parking-aid, reversing-aid, adaptive cruise control and pre-crash sensing applications.

Parking-aid and reversing-aid systems are typically used in the automotive industry and are becoming abundantly available in the market. Parking-aid systems and reversing-aid systems indicate to a vehicle operator that an object, that may not be visible to the vehicle operator, is within a stated distance of the vehicle. The vehicle operator may then respond accordingly.

Parking-aid systems are typically used to detect an object forward and rearward of a host vehicle. When the host vehicle is traveling in a forward direction at relatively slow velocities of approximately less than 10 kmph, the parking-aid system detects objects approximately within 1 m forward of the host vehicle. When the vehicle is in a reverse gear, such that the vehicle is traveling in a rearward direction the parking-aid system typically detects objects ranging from within approximately 2 m of the host vehicle.

Reversing-aid systems detect objects only in the back of the vehicle. Reversing-aid systems are typically used to detect an object rearward of and within approximately 2 m of the host vehicle to within approximately 5 m of the host vehicle, when the host vehicle is in a reverse gear. Thus, when the vehicle is in the reverse gear, a rearward sensing system operating in a reversing-aid mode covers the requirements for both reversing-aid and rearward parking-aid systems.

Pre-collision systems typically detect objects in the front or rear of the vehicle when traveling in the forward direction at speeds approximately above 10 kmph, but at relatively larger distances than that of parking-aid systems and reversing-aid systems. It is preferred in pre-collision systems to accurately detect relative velocities of objects with relatively higher accuracy for relatively larger distances and utilize a relatively quicker update rate.

Adaptive cruise control systems adjust a host vehicle traveling speed to maintain a safe operating distance between the host vehicle and a target vehicle. Lane departure and lane-keeping systems monitor lane markers or roadway lane designating lines, which sometimes are referred to as lane striping or lane separating lines, and generates a warning signal to warn a vehicle operator when a host vehicle is departing from or is not maintaining travel within a current operating lane.

The parking-aid, reversing-aid, and pre-collision systems commonly use multiple radar or ultrasonic sensors, which can be costly.

Although, the adaptive cruise control, lane departure, and lane-keeping systems tend to utilize fewer sensors than parking-aid, reversing-aid, and pre-collision systems, they also tend to be costly due to use of radar or vision sensors and use of vision processors.

It is desirable, when designing a vehicle to minimize vehicle components, system complexity, and vehicle production and manufacturing costs. It is therefore also desirable to provide an object detection system that may be applied as a parking-aid, reversing-aid, pre-collision, adaptive cruise control, lane departure, and lane-keeping system and at the same time minimizes the amount of object detection sensors and costs involved therein.

SUMMARY OF INVENTION

The present invention provides a system and method of performing object detection within an automotive vehicle utilizing vision-based technologies. A vision-based object detection system for a vehicle is provided. The vision-based system includes multiple vision sensing systems that have a vision receiver and generates an object detection signal. A controller includes a plurality of sensing system aid modules that correspond to each of the vision sensing systems. The controller operates the sensing system aid modules in response to a vehicle parameter and generates a safety system signal in response to the object detection signal. The sensing system aid modules have associated operating modes and operate the vision sensing systems in the operating modes in response to the vehicle parameter.

One of several advantages of the present invention is that it provides a single vision-based object detection system that is capable of operating in multiple sensing system modes and performing multiple collision avoidance, countermeasure, and comfort and convenience type tasks.

Another advantage of the present invention is that it utilizes a single controller microprocessor for operational control of multiple sensing systems. The controller is capable of operating in multiple sensing system modes, thus minimizing number of components, costs, and weight.

The present invention itself, together with attendant advantages, will be best understood by reference to the following detailed description, taken in conjunction with the accompanying figures.

BRIEF DESCRIPTION OF DRAWINGS

For a more complete understanding of this invention reference should now be made to embodiments illustrated in greater detail in the accompanying figures and described below by way of examples of the invention wherein.

DETAILED DESCRIPTION

In the following figures the same reference numerals will be used to refer to the same components. While the present invention is described with respect to a vision-based system and method of performing object detection near a vehicle, the present invention may be adapted and applied to various systems including: collision warning systems, collision avoidance systems, parking-aid systems, reversing-aid systems, passive countermeasure systems, adaptive cruise control systems, lane departure systems, lane-keeping systems, or other systems known in the art.

In the following description, various operating parameters and components are described for multiple constructed embodiments. These specific parameters and components are included as examples and are not meant to be limiting.

Also, in the following description, the term "slow vehicle traveling velocity" refers to a vehicle traveling at velocities less than or equal to approximately 10 kmph.

Additionally, in the following description, the term "performing" may include activating, deploying, initiating, powering, and other terms known in the art that may describe the manner in which a countermeasure or a comfort and convenience feature may be operated.

As well, in the following description, various countermeasures are discussed. The countermeasures may be reversible or irreversible. Reversible countermeasures refer to countermeasures that may be reset to their original form or used repeatedly without a significant amount of functional deficiency, which may be determined by a system designer. Irreversible countermeasures refer to countermeasures such as airbags that, once deployed, are not reusable.

Furthermore, a countermeasure signal may include information pertaining to the above-stated reversible and irreversible countermeasures or may include other information, such as collision warning information, and parking-aid or reversing-aid countermeasure information. For example, the countermeasure signal may contain object detection information, which may be used to indicate to a vehicle operator the presence or close proximity of a detected object.

Moreover, the term "vision receiver" may refer to a vision sensor lens, a vision sensor, a camera lens, a camera, or other vision receiver known in the art. A vision receiver may be stationary or may rotate or move in various directions. For example, in one embodiment of the present invention, vision receivers are in the form of high dynamic range wide-angle cameras.

In addition, the term "object" may refer to any animate or inanimate object. An object may be a vehicle, a pedestrian, a lane marker, a road sign, a roadway lane designating line, or other object known in the art.

Figure 1:
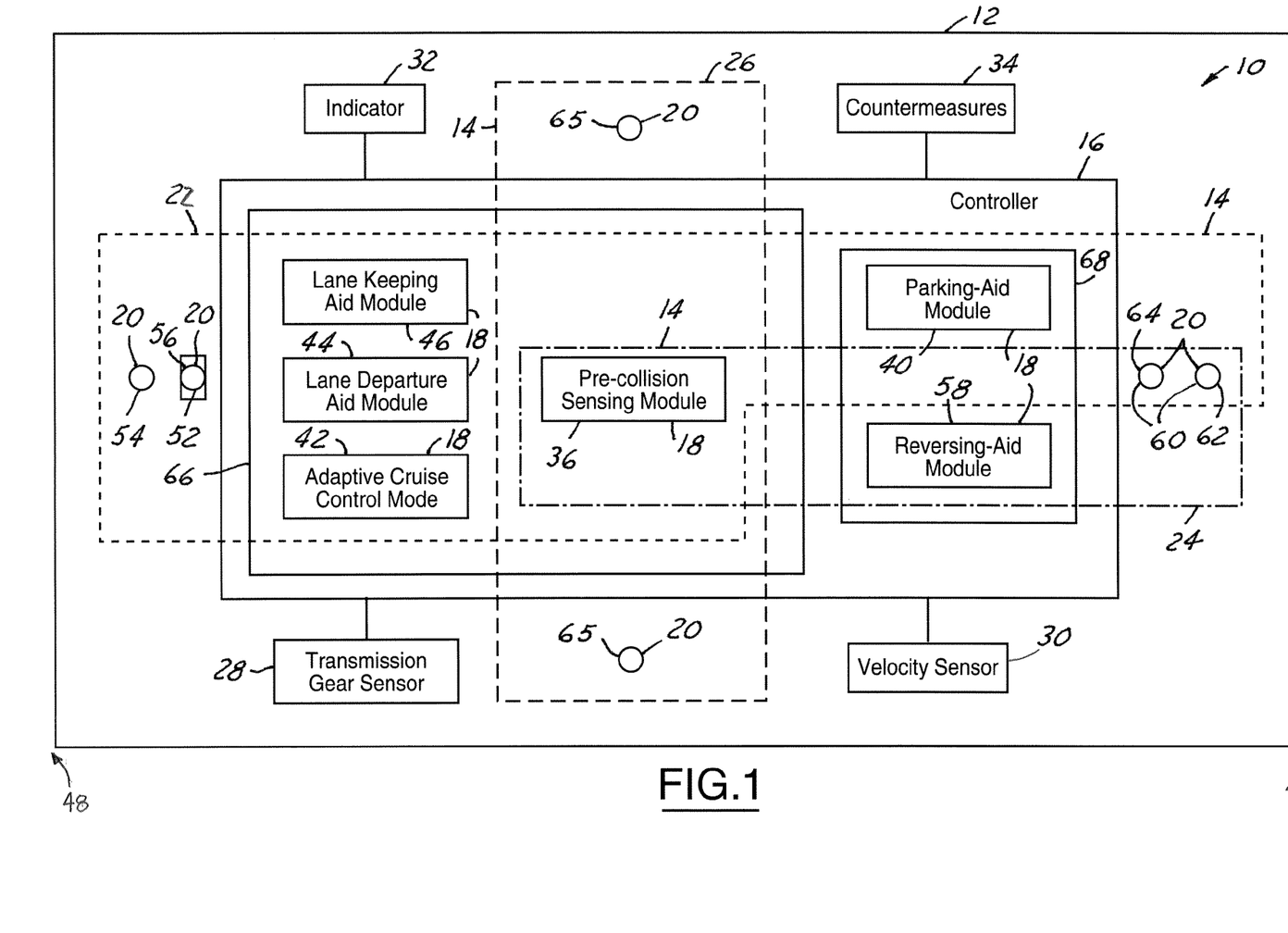
FIG. 1 is a block diagrammatic view of a vision-based object detection system for a vehicle in accordance with an embodiment of the present invention.

Referring now to FIG. 1, a block diagrammatic view of a vision-based object detection system 10 for a vehicle 12 in accordance with an embodiment of the present invention is shown. The system 10 includes multiple vision sensing systems 14 and a controller 16. Each of the vision sensing systems 14 has one or more sensing system aid modules 18, that are located within the controller 16, and respective vision receivers 20. The sensing systems 14 include a frontal and rear collision vision sensing system 22, a rearward collision vision sensing system 24, and a side collision vision sensing system 26. The sensing systems 14 detect and monitor objects that are in close proximity to the vehicle 12. The controller 16 receives current vehicle status information from a transmission gear sensor 28 and a velocity sensor 30 and in response to detected objects generates countermeasure signals for countermeasure indication, via an indicator 32, or activation of appropriate countermeasures, which is represented by box 34.

The sensing systems 14 have multiple modes for performing multiple collision avoidance, countermeasure, and comfort and convenience type tasks of operation. The modes include a reversing-aid mode, a parking-aid mode, a pre-collision mode, an adaptive cruise control mode, a lane departure mode, a lane-keeping mode, or other sensing system modes known in the art.

The parking-aid mode consists of a forward detection mode and a rearward detection mode. The rearward detection mode is similar to the reversing-aid mode. The forward detection mode refers to monitoring a forward sensing zone having a sensing distance of approximately up to 1 meter and a lateral sensing distance that is approximately equal to 0.5 m. The reward detection mode refers to monitoring a rearward-sensing zone having a sensing distance of approximately up to 2.0 m to 5.0 m and a lateral sensing distance of approximately equal to 0.5 m. For an illustration of the forward sensing zone, the rearward sensing zone, and the lateral sensing zones, as described above and for a further detailed explanation on the parking-aid mode and the reversing-aid mode see the patent applications incorporated herein by reference.

Figure 2:
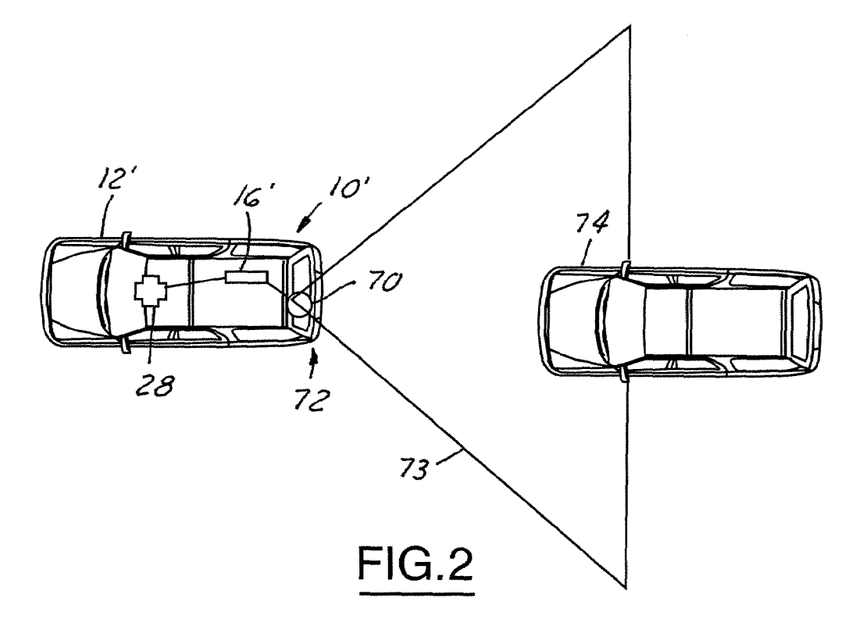
FIG. 2 is a top perspective view and an illustrative detection area diagram for a vision-based object detection system having a rearward directed vision receiver in accordance with another embodiment of the present invention.
Figure 3:
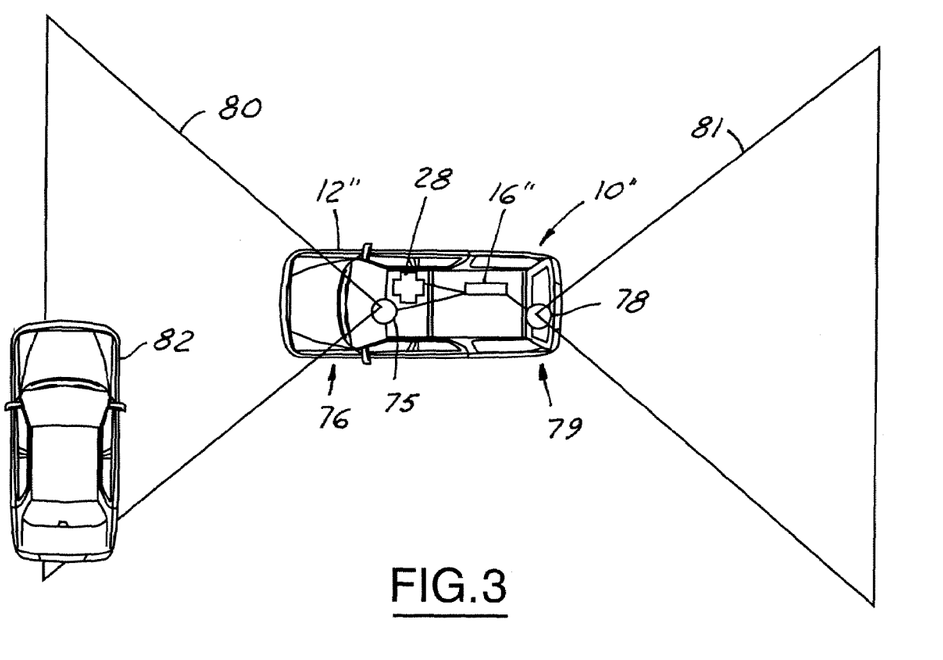
FIG. 3 is a top perspective view and an illustrative detection area diagram for a vision-based object detection system having a forward directed vision receiver and a rearward directed vision receiver in accordance with another embodiment of the present invention.
Figure 4:
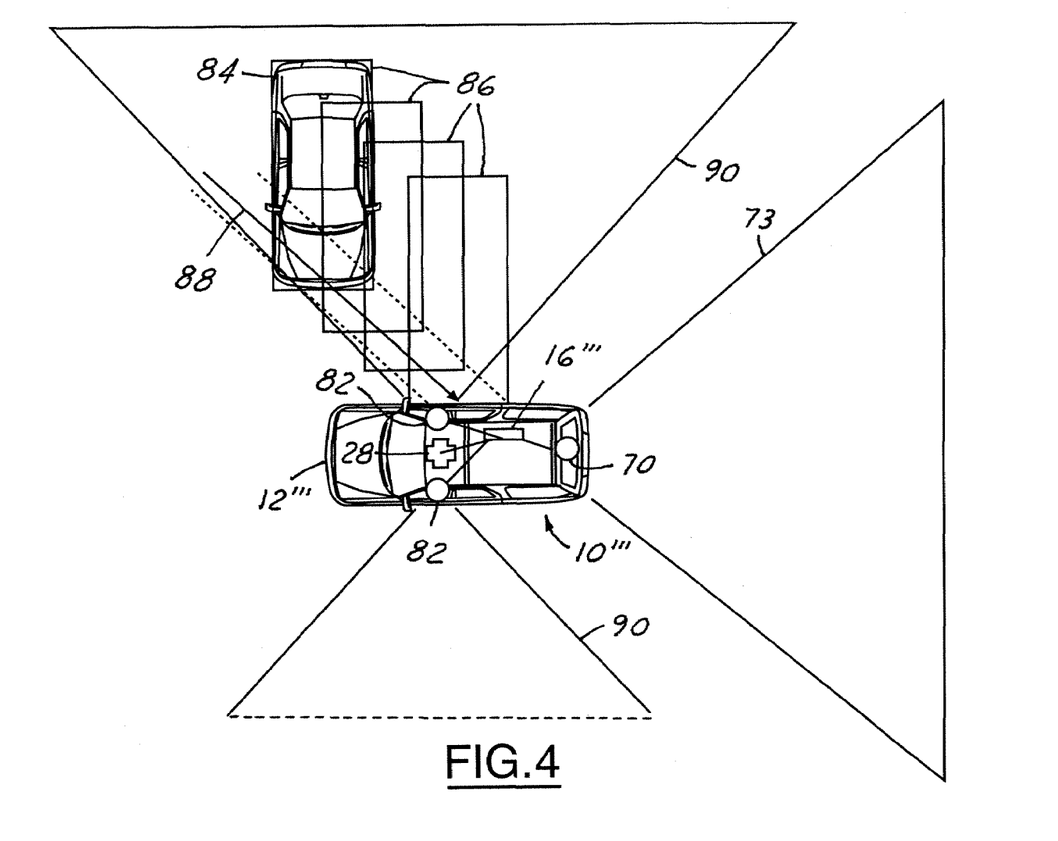
FIG. 4 is a top perspective view and an illustrative detection area diagram for a vision-based object detection system having a pair of side directed vision receivers and a rear directed vision receiver in accordance with another embodiment of the present invention.

The pre-collision mode may consist of a forward detection zone, a rearward detection zone, or a side detection zone, as is best seen in FIG. 2–4. The pre-collision detection zones in general are larger in area and cover larger distances away from the vehicle 12 as compared to the detection zones of the parking-aid mode and of the reversing-aid mode.

The adaptive cruise control mode is used for monitoring objects forward of the vehicle 12 and for maintaining a safe predetermined distance away from the detected objects to prevent collision therewith. When operating in the adaptive cruise control mode the controller 16 may warn a vehicle operator of an impending object or perform a countermeasure as to alter speed of travel of the vehicle 12.

The lane departure mode and the lane-keeping mode refer to modes by which the controller 16 monitors lane markings or roadway lane designating lines and warns a vehicle operator when the vehicle 12 is exiting a current lane of travel, directed to exit a current lane of travel, and performs a countermeasure 34 and/or maintains a current lane of travel, such as by supplementing the steering control of the vehicle 12.

Performance of the sensing systems 14 depends upon a selected mode of operation and corresponding countermeasures 34 to be performed. For example, in the parking-aid mode and in the reversing-aid mode it may be desirable to detect positioning of objects with relatively higher accuracy as compared to when in the pre-collision mode. In the pre-collision mode it may be desirable to accurately detect relative velocities of objects with relatively higher accuracy for relatively larger distances and utilize a relatively quicker update rate. Update rate refers to time between object detection signals, or sometimes it is referred to as a refresh rate. There can exist a tradeoff between accurately measuring object positioning versus accurately measuring velocity of objects relative to the vehicle 12 and update rate.

The frontal and rear vision system 22 includes a pre-collision sensing module 36, a parking-aid module 40, an adaptive cruise control module 42, a lane departure aid module 44, and a lane-keeping aid module 46. The frontal and rear vision system 22 detects and monitors objects in close proximity of a forward portion 48 and a rearward portion 49 of the vehicle 12 through use of one or more of the vision receivers 20. The vision receivers 20, as used by the frontal part of the frontal and rear vision system 22, may be located in or near and coupled to a bumper or a grill (both of which are not shown) of the vehicle 12, may be mounted to a backside of a rear view mirror 52, or may be located elsewhere in the vehicle 12. For example, when the frontal and rear vision system 22 is in the parking-aid mode the system 22 may utilize a vision sensor 54 that is located relatively closer to the front of the vehicle 12, such that view area directly in front of the vehicle 12 is unobstructed by vehicle structure or components. When the frontal vision system 22 is in a pre-collision mode and is monitoring a larger area forward of the vehicle 12 the frontal and rear vision system 22 may utilize a vision receiver 56 located on the rearview mirror 52.

The rearward only vision system 24 includes the pre-collision sensing module 36 and a reversing-aid module 58. The rear vision part of the frontal and rear vision system 22, and the vision part of the rearward system 24 may also utilize one or more of the vision receivers 20, such as vision sensors 60, which may be located in or near a rear bumper (not shown) of the vehicle 12 or may be mounted near a rear roof edge (also not shown) and be directed rearward. A near bumper mounted vision sensor 62 may be used when in a reversing-aid mode or a parkingaid mode. A near roof edge vision sensor 64 may be utilized when in a pre-collision mode. The rearward vision system 24 may for example when operating in a reversing-aid mode indicate to a vehicle operator, via the indicator 32, an audible sound or a video signal that the vehicle 12 is moving in a direction as to potentially collide with an impending object.

The side vision system 26 includes the pre-collision sensing module 36. The side vision system 26 may also have any number of the vision receivers 20. In the embodiments of FIGS. 1 and 4 a single vision receiver 65 is used on each side of the vehicle 12.

The controller 16 includes collision avoidance and countermeasure modules 66 and comfort and convenience modules 68. The collision avoidance and countermeasure modules 66 include the pre-collision sensing module 36, the adaptive cruise control module 42, the lane departure aid module 44, and the lane-keeping aid module 46. The comfort and convenience modules 68 include the reversing-aid module 58 and the parking-aid module 40. Of course, the controller 16 may include other sensing system aid modules known in the art. The modules 66 and 68 include corresponding algorithms for performing the above-stated modes of operation and may be software based.

The controller 16 may operate the system 10 in any or all of the above stated modes simultaneously. The controller 16 to obtain an appropriate operating performance for a selected operating mode, may adjust accuracy measurements corresponding with object relative position and velocity, as well as adjusting update rate and field of view (FOV). In adjusting FOV the controller 16 may transition between different lenses, transition between different cameras, may generate a split screen, or perform some other FOV adjusting technique known in the art. A split screen (not shown), for example, may be utilized to monitor both directly in front of the vehicle 12 and areas farther from the vehicle 12. A first half of the screen may have a first FOV and a second half of the screen may have a second FOV. The controller 16 may operate one vision receiver in a parking-aid mode having a first resolution and simultaneously operate a second vision receiver in a pre-collision mode with a second resolution that is different from that of the first resolution, in order to compensate or adjust for different desired FOVs.

The controller 16 may be microprocessor based such as a computer having a central processing unit, memory (RAM and/or ROM), and associated input and output buses. The controller 16 may be an application-specific integrated circuit or other logic devices known in the art. The controller 16 may be a portion of a central vehicle main control unit, an interactive vehicle dynamics module, a restraints control module, a main safety controller, or may be a stand-alone controller as shown.

The controller 16 determines which of the sensing system modes to operate in and operates the appropriate corresponding vision receivers 20 in response thereto. The controller 16 while operating in one or more of the sensing system modes may determine to perform one or more of the countermeasures 34 and indicate to a vehicle operator various object and vehicle status information. Depending upon the vehicle and object relative positions, velocities, and accelerations, the controller 16 may determine whether to indicate to a vehicle operator of a potential collision or may perform a countermeasure, as needed, so as to prevent a collision, mitigate a potential injury, or prevent the vehicle 12 from traveling outside a current lane of travel.

The controller 16 may also determine whether system devices are malfunctioning and indicates to a vehicle operator corresponding information in that respect. When a system device is malfunctioning the controller 16 may disable that system device, as well as other vehicle devices to prevent a device from performing inappropriately.

The gear sensor 28 may also be of various forms. The gear sensor 28 may be in the form of a switch, a solenoid, a motion sensor, an encoder, or in another form known in the art. The gear sensor 28 determines the operating gear of the vehicle 12 and generates a gear signal. Note the gear sensor 28 may detect an operating gear of a conventional mechanical transmission or may correspond to an operating range of an electronic transmission.

The velocity sensor 30 may be of various forms, such as a transmission rotation sensor, a wheel speed sensor, an optical sensor, or other velocity sensor known in the art. The velocity sensor 30 determines the traveling speed of the vehicle 12 and generates a velocity signal.

Indicator 32 is used to signal or indicate a safety system signal, which may include a warning signal, a collision-warning signal, a countermeasure signal, or an object identification signal in response to the object detection signals. The indicator 32 may include a video system, an audio system, an LED, a light, global positioning system, a heads-up display, a headlight, a taillight, a display system, a telematic system or other indicator. The indicator 32 may supply warning signals, collision-related information, lane departure and lane-keeping information, external-warning signals to objects or pedestrians located outside of the vehicle 12, or other pre and post collision information.

The countermeasures 34 may include passive countermeasures such as pre-arming airbags, activating a reversible seatbelt pre-tensioner, or activating a headrest mechanism. Countermeasures 34 may also include brake control, throttle control, steering control, suspension control, transmission control, chassis control, and other passive or active countermeasures known in the art. The countermeasures 34 may include, for example, steering a vehicle to prevent departure from a current lane of travel or may include indicating to a vehicle operator that the vehicle 12 is exiting or is directed as to exit the current lane of travel.

The vision-based system 10 may be in various configurations and utilize any number of the sensing systems 14 and in any combination thereof. Of course, for simplicity and cost reduction, the present invention may be modified and simplified so as to have a reduced number of components and operate in a reduced number of modes. In reducing the number of modes of operation, controller 16 processing ability requirements are also reduced, which in general further decreases costs of the system 10. The processing ability of a controller 16 may reflect the number of and the different types of sensing system modes that are used for a given application. The less sensing system modes that are to be performed by the controller 16, the lower the degree of processing capability required of the controller 16. For example, when performing multiple sensing system modes that utilize multiple vision receivers, processing speed of the controller 16 is at least at a speed that adequately maintains appropriate update rate for each vision receiver. Maintaining appropriate update rate also maintains sufficient accuracy for each of the modes utilized therein. A combination of front and rear vision system 22, and the side vision system 26 of FIG. 1 provides a comprehensive 360 degree vehicle coverage; FIGS. 2–4 illustrate other relatively simplified embodiments of the present invention.

Referring now to FIGS. 2–4, top perspective views and illustrative detection area diagrams for vision-based object detection systems, are shown, in accordance with multiple embodiments of the present invention.

The embodiment of FIG. 2, is directed towards a vision-based object detection system 10' that is simplified from that of FIG. 1 as to operate in either a reversing-aid mode or in a rearward pre-collision sensing mode. A single vision receiver 70 is mounted in a rear portion 72 of a host vehicle 12' and is directed rearward to monitor detection area 73 for an object, such as target 74. A controller 16' is coupled to the vision receiver 70 and to the transmission gear sensor 28. The rearward pre-collision sensing mode is similar to that of the pre-collision sensing mode except that the controller 16' monitors for objects rearward of the vehicle 12' and not forward of the vehicle 12'.

The embodiment of FIG. 3, is directed towards a vision-based object detection system 10" that is simplified from that of FIG. 1 as to operate in a parking-aid mode, a pre-collision mode, an adaptive cruise control mode, a lane departure mode and in a lane-keeping mode. A first vision receiver 75 is mounted in a forward portion 76 of the vehicle 12" and a second vision receiver 78 is mounted in a rearward portion 79 of the vehicle 12" to monitor a forward detection area 80 and a rearward detection area 81, respectively. A forward target 82 is shown. A controller 16" is coupled to both vision receivers 75 and 78 and the transmission gear sensor 28 and detects and monitors objects forward and rearward of the vehicle 12".

The embodiment of FIG. 4 is similar to that of FIG. 2, except that it further includes a pair of side vision receivers 82 that are coupled to a controller 16'''. Vision-based detection system 10''' of FIG. 4 when operating in a pre-collision mode utilizes the pair of vision receivers 82 to also monitor objects laterally or to the side of the vehicle 12''', such as a target vehicle 84 approaching the vehicle 12''', as represented by boxes 86 and arrow 88. Side detection areas 90 are shown in addition to the rear detection area 73.

Although, not shown the embodiments of FIGS. 2–4 may also include a velocity sensor, an indicator, and countermeasures, such as the velocity sensor 30, the indicator 32, and the countermeasures 34.

Figure 5:
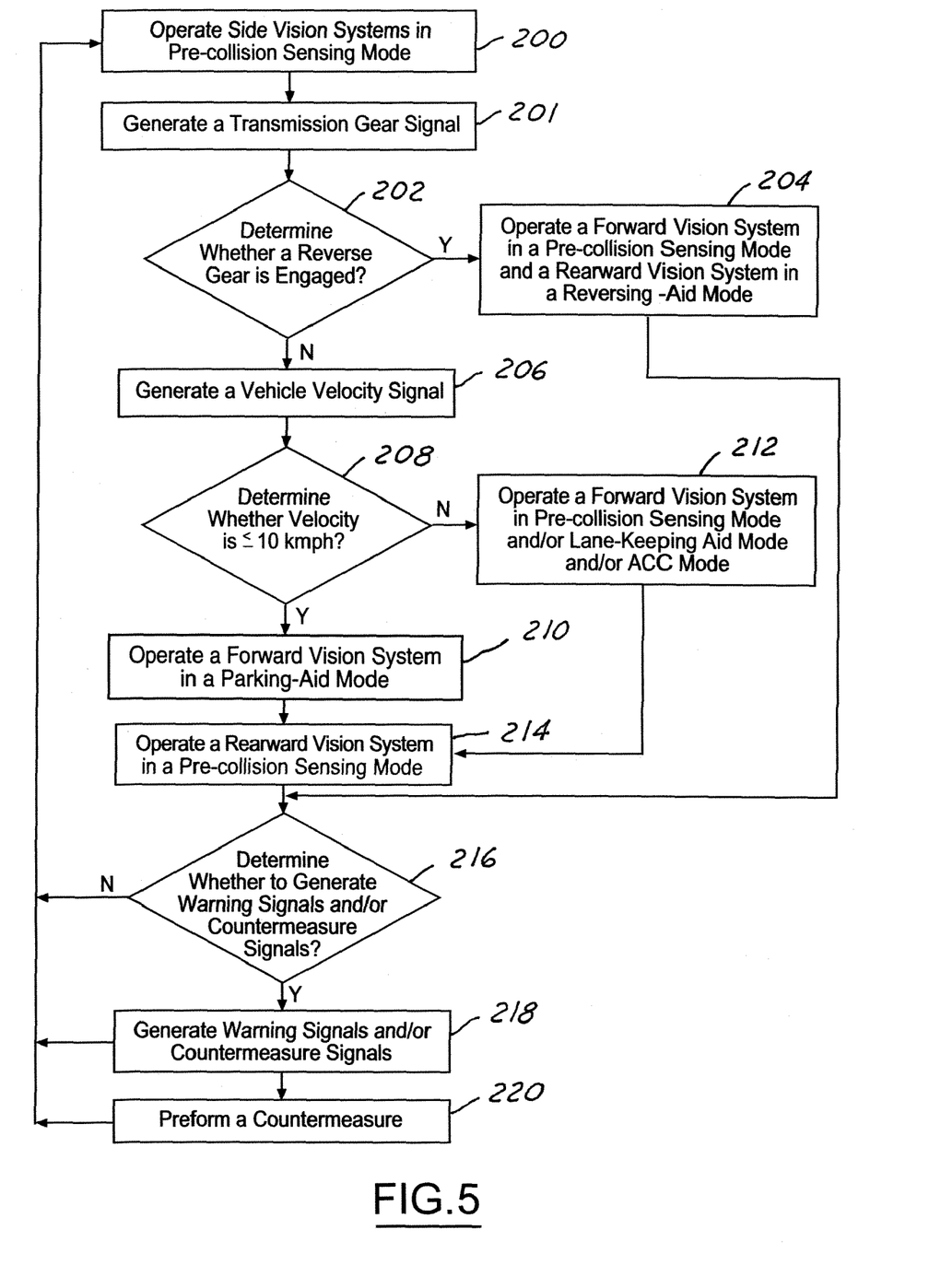
FIG. 5 is a logic flow diagram illustrating a method of performing object detection decision-making within a vehicle utilizing a vision-based object detection system in accordance with multiple embodiments of the present invention.

Referring now to FIG. 5, a logic flow diagram illustrating a method of performing object detection decision-making, for indicator and countermeasure activation within the vehicle 12 utilizing the system 10 in accordance with embodiments of the present invention is shown. Although the following steps are described in respect to the embodiment of FIG. 1, the steps may be utilized and modified for other embodiments of the present invention.

In step 200, the side vision system 26 is operated in the pre-collision mode. In step 201, the gear sensor 28 generates a transmission gear signal representing a current operating gear. The vehicle 12 may be operating in a forward gear, a rearward gear, or a stationary gear. In step 202, the controller 16 determines whether the vehicle 12 is in a reverse gear in response to the gear signal.

In step 204, when a reverse gear is engaged, the controller 16 operates the forward part of the vision system 22 in the pre-collision sensing mode and the rearward part of the vision system 22, which is functionally similar to the vision system 24 in the reversing-aid mode. In step 206, when a reverse gear is not engaged, the controller 16 receives the vehicle velocity signal generated by the velocity sensor 30.

In step 208, the controller 16 determines when velocity of the vehicle 12 is less than 10 kmph. In step 210, when velocity of the vehicle 12 is less than 10 kmph, the controller 16 operates the forward vision system in the parking-aid mode. In step 212, when velocity of the vehicle 12 is greater than 10 kmph, the controller 16 may operate the forward vision system 22 in the pre-collision sensing mode, in the adaptive cruise control mode, in the lane departure mode, in the lane-keeping mode, or in any combination thereof.

In step 214, whether velocity of the vehicle 12 is less than, equal to, or greater than 10 kmph the controller 16 operates the rearward vision system 24 in a pre-collision sensing mode. In one embodiment of the present invention steps 210 or 212 and step 214 are performed simultaneously.

In step 216, the controller 16 assesses whether to generate warning signals or countermeasure signals or both the warning and countermeasure signals in response to detection of objects. The warning signals and countermeasure signals may be indicated to a vehicle operator via the indicator 32.

When the controller 16 determines that no warning signals or countermeasure signals are to be generated the controller 16 returns operation to step 200. When warning signals or countermeasure signals are generated, the controller 16 proceeds to step 218.

In step 218, the controller 16 may generate warning signals or countermeasure signals in response to the above-stated assessment. The countermeasure signals may include a slow vehicle traveling velocity countermeasure signal, a parking-aid countermeasure signal, a reversing-aid countermeasure signal, a pre-collision countermeasure signal, an adaptive cruise control countermeasure signal, a lane departure countermeasure signal, a lane-keeping countermeasure signal, or other countermeasure signal known in the art. In generating the warning signals and countermeasure signals the controller 16 may indicate to a vehicle operator object information of existing objects in various detection areas or sensing zones around the vehicle 12, so that the operator may respond accordingly. The warning signals may be audible, visual, or haptic. When generating the warning signals, the controller 16 may mute other vehicle audio systems, to provide clear alert potential collision and countermeasure information.

In step 220, the controller 16 may perform one or more of the countermeasures in response to the countermeasure signals generated in step 218. For example, the controller 16 may activate a braking system (not shown), to slow the vehicle 12 to mitigate the potential for injury to a vehicle occupant or to stop the vehicle 12 and prevent colliding with a detected object. Upon completion of steps 218 or 220 the controller 16 returns to step 200.

Figure 6:
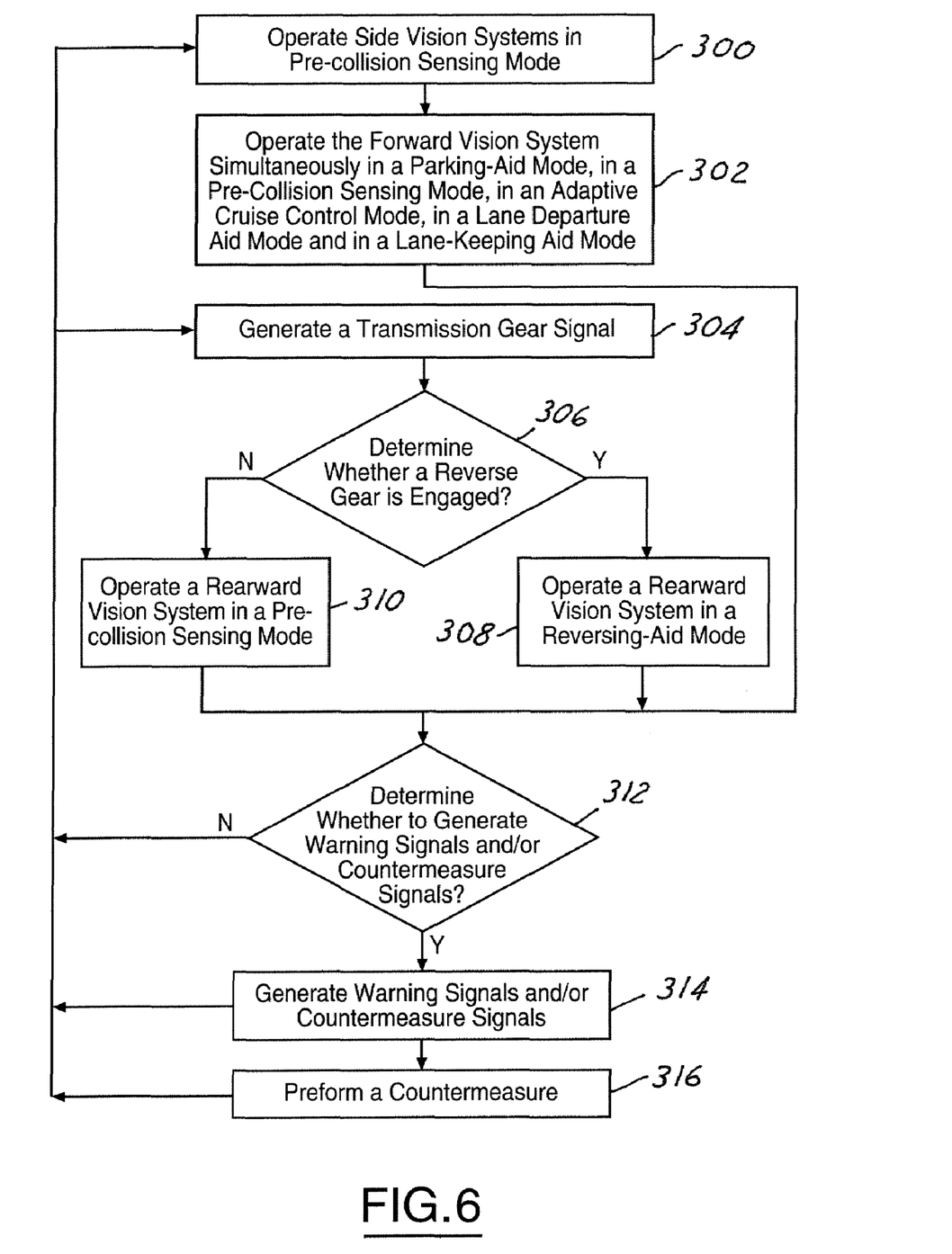
FIG. 6 is a logic flow diagram illustrating another method of performing object detection decision-making within a vehicle utilizing a vision-based object detection system in accordance with multiple embodiments of the present invention.

Referring now to FIG. 6, a logic flow diagram illustrating another method of performing object detection decision-making within the vehicle 12 utilizing the system 10 in accordance with embodiments of the present invention is shown. Although the following steps are described in respect to the embodiment of FIG. 1, the steps may also be utilized and modified for other embodiments of the present invention.

In step 300, as in step 200, the controller 16 operates the side vision system 26 in the pre-collision sensing mode. In step 302, the controller 16 operates the forward part of the vision system 22 in the parking-aid mode, in the pre-collision sensing mode, and adaptive cruise control mode simultaneously. The controller 16 may also operate the forward part of the vision system 22 in the lane departure mode and in the lane-keeping mode. Object detection signals for each mode of operation are continuously assessed. The vision sensor 54 located near the front of the bumper may be used for frontal parking-aid mode, and the vision sensor 56 located near the rearview mirror may be used simultaneously for pre-collision sensing, adaptive cruise control, lane-departure and lane-keeping modes. The controller 16 may proceed to step 312.

In step 304, as in step 201, the gear sensor 28 generates a gear signal representing a current operating gear. In step 306, as in step 202, the controller 16 determines whether the vehicle 12 is in a reverse gear in response to the gear signal. In step 308, when the reverse gear is engaged, the controller 16 operates the rearward vision system 24 or the rear part of the vision system 22 in the reversing-aid mode. In step 310, when the reverse gear is not engaged, the controller 16 operates the rear vision system 24 or the rearward part of the vision system 22 in the pre-collision mode.

In step 312, as with step 216, the controller 16 assesses whether to generate warning signals, countermeasure signals or both in response to detection of objects. In step 314, as in step 218, the controller 16 may generate warning signals or countermeasure signals in response to the assessment in step 312. In step 316, as in step 220, the controller 16 may perform one or more of the countermeasures in response to the countermeasure signals generated in step 314.

The above-described steps of FIGS. 5 and 6 are meant to be illustrative examples; the steps may be performed sequentially, synchronously, simultaneously, or in a different order depending upon the application.

Although the controller 16 is described above as operating the sensing system aid modules 18 in response to vehicle speed and whether the vehicle 12 is in a reverse gear, the controller 16 may operate the sensing system aid modules 18 in response to other vehicle parameters known in the art.

The present invention provides a vision-based object detection system that has a single controller that is capable of operating in multiple sensing system modes. The present invention simplifies costs of using multiple vision-based systems through use of a single controller having multiple sensing system aid modules.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

The invention claimed is:

1. A vision-based object detection system for a vehicle comprising:
    a plurality of vision sensing systems comprising a frontal collision sensing system and having at least one vision receiver and generating an object detection signal; and
    a controller comprising a plurality of sensing system aid modules corresponding to each of said plurality of vision sensing systems, selecting and operating at least one of said plurality of sensing system aid modules in response to at least one vehicle parameter, and generating at least one safety system signal in response to said object detection signal;
    said plurality of sensing system aid modules and each of said at least one receiver having a plurality of associated active operating modes, said plurality of sensing system aid modules operating at least one of said plurality of vision sensing systems in at least one of said operating modes in response to said at least one vehicle parameter.

2. A system as in claim 1 wherein said plurality of vision sensing systems are selected from at least one of a frontal and rear collision vision sensing system, a rearward collision vision sensing system, and a side collision vision sensing system.

3. A system as in claim 1 wherein said controller operates said plurality of vision sensing systems in at least one mode selected from a reversing-aid mode, a parking-aid mode, a pre-collision sensing mode, an adaptive cruise control mode, a lane departure aid mode, and a lane-keeping aid mode.

4. A system as in claim 1 wherein said plurality of sensing system aid modules comprises a plurality of collision avoidance and countermeasure modules.

5. A system as in claim 4 wherein said plurality of collision avoidance and countermeasure modules comprises at least one module selected from a pre-collision sensing module, an adaptive cruise control module, a lane departure aid module and a lane-keeping aid module.

6. A system as in claim 1 wherein said plurality of sensing system aid modules comprise a plurality of comfort and convenience modules.

7. A system as in claim 6 wherein said plurality of comfort and convenience modules comprises at least one module selected from a reversing-aid module and a parking-aid module.

8. A system as in claim 1 further comprising a transmission gear sensor generating a transmission gear signal, wherein said controller operates said plurality of sensing system aid modules in response to said transmission gear signal.

9. A system as in claim 1 wherein said plurality of sensing systems comprise a side collision sensing system and said controller continuously operates said side collision sensing system in a pre-collision sensing mode.

10. A system as in claim 1 wherein said plurality of vision sensing systems comprises at least one frontal collision sensing system and said controller operating said at least one frontal collision sensing system in at least one mode selected from a parking-aid mode, a pre-collision sensing mode, an adaptive cruise control mode, a lane departure aid mode, and a lane-keeping aid mode.

11. A system as in claim 1 wherein said plurality of vision sensing systems comprises at least one rearward collision sensing system and said controller operating said at least one rearward collision sensing system in at least one mode selected from a parking-aid mode, a reversing-aid mode, and a pre-collision sensing mode.

12. A system as in claim 1 wherein said controller is a single vision processor.

13. A system as in claim 1 further comprising an indicator electrically coupled to said controller and wherein said controller indicates said safety system signal via said indicator.

14. A method of performing a plurality of sensing system aids for a vehicle comprising:
generating an object detection signal via a plurality of vision sensing systems comprising a forward vision sensor;
operating a plurality of sensing system aid modules, which comprise a parking-aid module that is used for both forward and rearward object detection simultaneously, via a single controller, said plurality of sensing system aid modules corresponding with each of said plurality of vision sensing systems; and
generating at least one safety system signal in response to said object detection signal.

15. A method as in claim 14 further comprising:
generating a transmission gear signal; and
operating said plurality of sensing system aid modules in response to said transmission gear signal.

16. A method as in claim 14 further comprising continuously operating a side collision vision sensing system in a pre-collision sensing mode.

17. A method as in claim 14 further comprising operating at least one frontal collision sensing system in at least one mode selected from a parking-aid mode, a pre-collision sensing mode, an adaptive cruise control mode, a lane departure aid mode, and a lane-keeping aid mode.

18. A method as in claim 14 further comprising operating at least one rearward collision sensing system in at least one mode selected from a parking-aid mode, a reversing-aid mode, and a pre-collision sensing mode.

19. A method as in claim 14 further comprising:
determining whether the vehicle is traveling below a predetermined velocity; and
operating said plurality of sensing system aid modules in response to said determination.

20. A vision-based object detection system for a vehicle comprising:
a transmission gear sensor generating a transmission gear signal;
a plurality of vision sensing systems having at least one vision receiver, generating an object detection signal, and operating simultaneously in a plurality of modes selected from a reversing-aid mode, a parking-aid mode corresponding to both frotal and rearward detection, a lane departure aid mode, and a lane-keeping aid mode; and
a single vision processor comprising a plurality of sensing system aid modules corresponding with each of said plurality of vision sensing systems, operating said plurality of sensing system aid modules in response to said transmission gear signal, and generating at least one warning signal or one countermeasure signal in response to said object detection signal.

* * * * *